July 19, 1938.  S. N. HEDMAN  2,124,418
SPEED GOVERNING MECHANISM
Filed Dec. 19, 1935
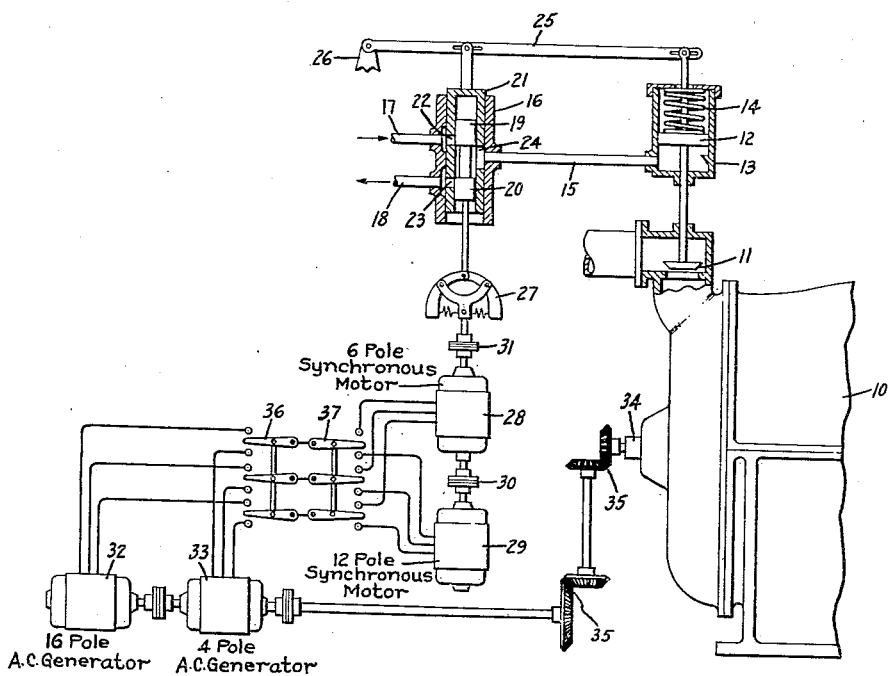
Inventor:
Sverker N. Hedman,
by Harry E. Dunham
His Attorney.

Patented July 19, 1938

2,124,418

UNITED STATES PATENT OFFICE

2,124,418

SPEED GOVERNING MECHANISM

Sverker N. Hedman, Stoneham, Mass., assignor to General Electric Company, a corporation of New York Application December 19, 1935, Serial No. 55,263

4 Claims. (Cl. 175—355)

The present invention relates to speed governing mechanisms for controlling prime movers, especially elastic fluid turbines having inlet valve means to be positioned in response to speed changes. Such mechanisms usually include a speed responsive device driven or operated from the prime mover shaft and connected to the element or elements to be controlled through the intermediary of a hydraulic motor and a relay. Difficulty is experienced whenever accurate control of speed is required over a wide range, particularly if the speed responsive device is in the form of a centrifugal type governor. Such centrifugal governors permit accurate control within a speed range of the order of 1:3, for example, where the prime mover speed varies within a speed range of from 500 to 1500 R. P. M. Beyond such range the ordinary centrifugal type of flyball governor does not give accurate control because the power of the governor, which varies as the square of the speed, becomes insufficient to attain sensitive regulation. Sensitive regulation, however, is of paramount importance where accurate speed control is desired, as is the case, for instance, in paper and other manufacturing processes.

The general object of my invention is to provide an improved construction and arrangement of speed control mechanisms whereby accurate speed control may be obtained within any desired range of speed change. This is accomplished in accordance with my invention by the provision of a speed responsive device and a variable speed electric drive for driving such device from the prime mover to be controlled. Such variable speed drive, in accordance with my invention, is preferably in the form of alternating current generator means driven from the prime mover and synchronous motor means, either one or both means having variable-pole number. The motor means is electrically connected to the generator means and arranged to operate a speed responsive device, preferably a centrifugal type or a flyball governor. With such arrangement the range of speed change with regard to the flyball governor may be held within certain limits, irrespective of the speed change of the prime mover, by changing the connection between the synchronous motor and generator means.

For a better understanding of what I believe to be novel and my invention, attention is directed to the following description and the claims appended thereto in connection with the accompanying drawing.

The single figure of the drawing represents a governing mechanism in connection with a prime mover in accordance with my invention.

The prime mover in the present instance is shown as an elastic fluid turbine 10 having an inlet valve 11 for controlling the flow of elastic fluid thereto. The valve 11 is connected to a piston 12 of a hydraulic motor 13. The piston is biased downward by means of a compression spring 14. Fluid under pressure is conducted to the motor and discharged therefrom through a conduit 15. The flow of fluid, more specifically the pressure of the fluid, is controlled by means of a relay or pilot valve 16. The latter has an outer casing connected to a conduit 17 for conducting oil or like actuating fluid thereto and a drain conduit 18 through which the actuating fluid is drained. Two valve heads 19 and 20 surrounded by a sleeve 21 are movably disposed within the casing. The sleeve 21 has ports 22 and 23 adjacent the casing connections with the conduits 17 and 18 respectively and another port 24 adjacent the casing connection with the conduit 15. The upper end of the sleeve is connected to an intermediate point of a lever 25, which latter has a left-hand end on a fulcrum 26 and a right-hand end pivotally connected to the piston 12 of the hydraulic motor 13. During normal operating conditions the valve heads 19, 20 cover the ports 22 and 23. If the speed of the prime mover increases, for instance, due to a decrease in load, the pilot valve is moved downward by the action of the speed governor whereby the valve head 20 uncovers the port 23, permitting oil to be drained from the hydraulic motor 13 through the pilot valve and the drain conduit 18. Discharge of oil from the hydraulic motor cylinder causes downward movement of the piston 12 by the action of the compression spring 14, resulting in closing movement of the valve 11. Downward movement of the piston 12 also effects downward turning movement of the lever 25 whereby the sleeve 21 is moved downward, thus establishing the original relative position between the sleeve 21 and the pilot valve heads 19, 20. Similarly, a decrease in speed which may be due to an increase in load on the prime mover causes upward movement of the pilot valve heads 19, 20, whereby the valve head 19 uncovers the port 22 to permit oil or like actuating fluid under pressure to be conducted from the inlet conduit 17 through the pilot valve into the lower part of the hydraulic motor cylinder 13. This effects upward movement of the piston 12, resulting in opening movement of the valve 11.

As stated before, accurate speed control with centrifugal type governors is limited to a speed range of about 1:3. In order to obtain great governor sensitivity and consequently accurate control for a wide speed range of the prime mover I provide in the present instance a variable speed electric drive between the centrifugal type governor and the prime mover shaft. This variable speed electric drive comprises two vertically arranged synchronous motors 28 and 29 having shafts connected to each other by a coupling 30. The shafts are connected by a coupling 31 to the spindle of the speed governor 27. The synchronous motors 28, 29 are electrically connected to A. C. generating means in the present instance to two generators 32, 33. The generators have their shafts in alinement and driven from the turbine shaft 34 through a gearing 35, in the present instance shown as a speed reducing gearing. The electrical connection between the A. C. generators and motors includes two switches 36 and 37 which are connected in series, the switch 36 being arranged for connection with either the conductors leading to the generator 32 or the conductors leading to the generator 33. Similarly, the switch 37 may be connected to conductors leading to the motor 28 or to conductors leading to the motor 29. Briefly, the arrangement is such that either of the generators may be connected with either of the motors. For example, if both switches are turned downward the 4-pole generator is connected to energize the 12-pole synchronous motor. All of the electric machines have been indicated as of the 3-phase type, the generators 32 and 33 have 16 poles and 4 poles respectively, whereas the motors 28 and 29 have 6 poles and 12 poles respectively, that is, the generators and motors have different pole numbers or at least one of the generator and motor means has a variable pole number.

The operation is as follows: Let us assume that the turbine at full speed is operated at 5400 R. P. M. and that at such speed the two generators are driven at 2250 R. P. M. Under this condition the 4-pole generator has a frequency of 75 cycles and a voltage of 275 volts. At one-fifth speed or 1080 R. P. M. of the turbine the frequency of the 4-pole generator is 15 cycles and the voltage 55 volts. When operating at high speed, namely at about 5400 R. P. M. the 4-pole generator is connected to the 12-pole motor. This gives a governor speed of 750 R. P. M. When the turbine is operating at one-half speed, namely at 2700 R. P. M., the generator giving then 37.5 cycles is connected to the 6-pole motor 28 so that the governor speed is again 750 R. P. M. The range of adjustment of the centrifugal governor of even 2.5:1 is then sufficient to permit a speed adjustment of the turbine from 5400 down to 2160 with the 4-pole generator connected to the 12-pole motor. If now the 4-pole generator is connected to the 6-pole motor, a further speed range from 2700 R. P. M. down to 1080 R. P. M. becomes available. If the speed is still further decreased, the 16-pole generator is connected to the 12-pole motor to give an adjustable range of from 1350 R. P. M. turbine speed down to 540 R. P. M. If the speed is still further decreased the 16-pole generator is connected to the 6-pole motor to give an adjustable range of from 675 R. P. M. turbine speed down to 270 R. P. M. Thus, in the present example, the various connections between the synchronous generators and motors permit accurate speed control within a turbine speed range of from 270 R. P. M. to 5400 R. P. M., that is a speed ratio of 1:20.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States, is:

1. A speed governing mechanism including a speed responsive device and a variable speed electric drive for operating the speed responsive device, the electric drive including synchronous generator means to be driven in proportion to the speed of a machine to be controlled, synchronous motor means for operating the device, at least one of the synchronous means having a variable pole number and means including an electric circuit and a switch for connecting the motor means to the generator means and for varying the ratio of the pole numbers of the generator means and the motor means.

2. A speed governing mechanism including the combination of a speed governor, synchronous A. C. motor means for driving the governor, synchronous alternator means driven in response to speed changes for energizing the motor means, at least one of said motor and generator means having a variable pole number and means for varying said pole number.

3. The combination of a prime mover having an element to be controlled and a governing mechanism for controlling the element in response to speed changes of the prime mover, said governing mechanism including a centrifugal type governor for moving the element to be controlled, synchronous motor means for driving the speed governor and synchronous generator means driven from the prime mover for energizing the synchronous motor means, at least one of the two last named means having a variable pole number.

4. The combination of an elastic fluid turbine having an inlet valve to be operated at a speed range of more than 1:3, and a governing mechanism for controlling the valve in response to speed changes comprising a hydraulic motor for moving the valve, a control member for controlling the hydraulic motor, a centrifugal type speed governor for moving the control member, two synchronous motors of different pole number for driving the centrifugal type governor, two generators of different pole numbers driven from the turbine and an electric circuit including switching means for connecting either of the generators with either of the motors.

SVERKER N. HEDMAN.